US008296317B2

(12) United States Patent
Ghosh

(10) Patent No.: US 8,296,317 B2
(45) Date of Patent: Oct. 23, 2012

(54) SEARCHABLE OBJECT NETWORK

(75) Inventor: Rajesh Ghosh, Kalyani (IN)

(73) Assignee: Oracle International Corporation, Redwood Shores, CA (US)

( * ) Notice: Subject to any disclaimer, the term of this patent is extended or adjusted under 35 U.S.C. 154(b) by 606 days.

(21) Appl. No.: 12/210,420

(22) Filed: Sep. 15, 2008

(65) Prior Publication Data

US 2010/0070496 A1    Mar. 18, 2010

(51) Int. Cl.
G06F 7/00 (2006.01)
G06F 17/30 (2006.01)
(52) U.S. Cl. ........................................ 707/769; 707/763
(58) Field of Classification Search ................. 707/769
See application file for complete search history.

(56) References Cited

U.S. PATENT DOCUMENTS

| | | | |
|---|---|---|---|
| 6,629,097 B1 * | 9/2003 | Keith | 1/1 |
| 6,810,376 B1 | 10/2004 | Guan et al. | |
| 7,155,715 B1 | 12/2006 | Cui et al. | |
| 7,249,100 B2 | 7/2007 | Murto et al. | |
| 7,426,526 B2 | 9/2008 | Chen et al. | |
| 7,761,480 B2 | 7/2010 | Toledano et al. | |
| 7,827,169 B2 | 11/2010 | Enenkiel | |
| 8,140,556 B2 | 3/2012 | Rao et al. | |
| 2002/0174117 A1 | 11/2002 | Nykanen | |
| 2004/0098358 A1 | 5/2004 | Roediger | |
| 2004/0213409 A1 | 10/2004 | Murto et al. | |
| 2005/0182792 A1 | 8/2005 | Israel et al. | |
| 2005/0234889 A1 | 10/2005 | Fox et al. | |
| 2006/0048155 A1 | 3/2006 | Wu et al. | |
| 2006/0053098 A1 | 3/2006 | Gardner et al. | |
| 2006/0053172 A1 | 3/2006 | Gardner et al. | |
| 2006/0165040 A1 | 7/2006 | Rathod et al. | |
| 2006/0184617 A1 | 8/2006 | Nicholas et al. | |
| 2007/0038609 A1 | 2/2007 | Wu | |
| 2007/0055691 A1 | 3/2007 | Statchuk | |
| 2007/0106933 A1 | 5/2007 | Nene et al. | |
| 2007/0150387 A1 * | 6/2007 | Seubert et al. | 705/31 |
| 2007/0162467 A1 | 7/2007 | Wolber et al. | |
| 2007/0192351 A1 | 8/2007 | Liu et al. | |
| 2007/0208697 A1 | 9/2007 | Subramaniam et al. | |
| 2007/0226242 A1 * | 9/2007 | Wang et al. | 707/102 |
| 2007/0239674 A1 | 10/2007 | Gorzela | |
| 2007/0244865 A1 | 10/2007 | Gordon et al. | |
| 2007/0299813 A1 | 12/2007 | Subramaniam et al. | |
| 2008/0005194 A1 | 1/2008 | Smolen et al. | |
| 2008/0021881 A1 | 1/2008 | Subramaniam et al. | |
| 2008/0091448 A1 | 4/2008 | Niheu et al. | |

(Continued)

OTHER PUBLICATIONS

Author Unknown, "Jena Adaptor Release 2.0 for Oracle Database—README," Jena, Aug. 2008, 9 pages.

(Continued)

*Primary Examiner* — Etienne Leroux
*Assistant Examiner* — Mohammad Rahman
(74) *Attorney, Agent, or Firm* — Kilpatrick Townsend & Stockton LLP

(57) ABSTRACT

Methods and systems for preparing data for searching and performing searches are provided. Searchable data definitions describe the location and format of searchable data within enterprise applications. Documents may be created from the searchable data definitions and indexed by a search engine, while preserving semantic information available within the enterprise application. Search results can include an indication of objects that are semantically related to each search result, providing more information and increased navigation and search options.

12 Claims, 9 Drawing Sheets

U.S. PATENT DOCUMENTS

| | | | |
|---|---|---|---|
| 2008/0126476 | A1 | 5/2008 | Nicholas et al. |
| 2008/0133960 | A1 | 6/2008 | Wong et al. |
| 2008/0168420 | A1 | 7/2008 | Sabbouh |
| 2008/0183674 | A1 | 7/2008 | Bush et al. |
| 2008/0215519 | A1 | 9/2008 | Runge et al. |
| 2008/0275844 | A1 | 11/2008 | Buzsaki et al. |
| 2009/0077094 | A1 | 3/2009 | Bodain |
| 2009/0150735 | A1 | 6/2009 | Israel et al. |
| 2009/0292685 | A1 | 11/2009 | Liu et al. |
| 2010/0010974 | A1 | 1/2010 | Chieu et al. |
| 2010/0017606 | A1* | 1/2010 | Bradley et al. ............ 713/168 |
| 2010/0057702 | A1 | 3/2010 | Ghosh et al. |
| 2010/0070517 | A1 | 3/2010 | Ghosh et al. |
| 2010/0185643 | A1 | 7/2010 | Rao et al. |
| 2010/0228782 | A1 | 9/2010 | Rao et al. |

OTHER PUBLICATIONS

Author Unknown, "Oracle Database 11g Release 2 Semantic Technologies Using the Jena Adaptor for Oracle Database," Oracle Corporation, 2009, 24 pages.

Author Unknown, "Semantic Technologies Center," Oracle Corporation, [online], [retrieved on Dec. 29, 2009]. Retrieved from: http://www.oracle.com/technology/tech/semantic_technologies/index.html?_template=/oc.

Author Unknown, "SPARQL Protocol for RDF," W3C, [online], 2008, [retrieved on Aug. 16, 2011]. Retrieved from: http://www.w3.org/TR/2008/REC-rdf-sparql-protocol-20080115/.

Author Unknown, "Web Services Description Language (WSDL) Version 2.0: RDF Mapping", W3C, [online], 2007, [retrieved on Aug. 16, 2011]. Retrieved from: http://www.w3.org/TR/2007/NOTE-wsdl20-rdf-20070626/.

Bechhofer, S., et al, "OWL Web Ontology Language Reference", W3C, [online], 2004, [retrieved on Aug. 16, 2011]. Retrieved from: http://w3.org/TR/2004/REC-owl-ref-20040210/.

Dickinson, I., "Jena Ontology API", Jena.Sourceforge.net, [online], 2009, [retrieved on Aug. 16, 2011]. Retrieved from: http://jena.sourceforge.net/ontology/index.html.

McBride, B., "An Introduction to RDF and the Jena RDF API", Jena.Sourceforge.net., [online], 2010 [retrieved on Aug. 16, 2011]. Retrieved from: http://jena.sourceforge.net/tutorial/RDF_API/index.html.

Munsinger, L., et al., "Oracle Application Development Framework Overview," Oracle Corporation, 2006, 11 pages.

Pollock, J., "A Semantic Web Business Case", W3C, 2008, 6 pages.

Sirin, E., et al., "Pellet: A Practical OWL-DL Reasoner", [online], [retrieved on Aug. 16, 2011]. Retrieved from: http://pellet.owldl.com/papers/sirin07pellet.pdf.

Wu, Z., et al., "Oracle Semantic Technologies Inference Best Practices with RDFS/OWL", Oracle Corporation, 2009, 11 pages.

U.S. Appl. No. 11/742,961, filed May 1, 2007, Office Action dated Jun. 22, 2009, 22 pages.

U.S. Appl. No. 11/742,961, filed May 1, 2007, Final Office Action dated Dec. 31, 2009, 23 pages.

U.S. Appl. No. 11/742,961, filed May 1, 2007, Notice of Allowance dated Mar. 9, 2010, 7 pages.

U.S. Appl. No. 12/201,308, filed Aug. 29, 2008, Office Action dated Jan. 18, 2011, 10 pages.

U.S. Appl. No. 12/201,308, filed Aug. 29, 2008, Final Office Action dated Aug. 26, 2011, 9 pages.

U.S. Appl. No. 12/212,178, filed Sep. 17, 2008, Office Action dated Jan. 21, 2011, 17 pages.

U.S. Appl. No. 12/212,178, filed Sep. 17, 2008, Final Office Action dated Aug. 25, 2011, 18 pages.

U.S. Appl. No. 12/393,872, filed Feb. 26, 2009, Office Action dated Mar. 2, 2011, 8 pages.

U.S. Appl. No. 12/393,872, filed Feb. 26, 2009, Final Office Action dated Aug. 16, 2011, 2 pages.

U.S. Appl. No. 12/356,314, filed Jan. 20, 2009, Office Action dated Jul. 22, 2011, 10 pages.

U.S. Appl. No. 12/201,308, filed Aug. 29, 2008, Notice of Allowance dated Apr. 12, 2012, 8 pages.

U.S. Appl. No. 12/212,178, filed Sep. 17, 2008, Office Action dated Apr. 25, 2012, 15 pages.

Alonso, et al., "Oracle Secure Enterprise Search 10g", An Oracle Technical White Paper, Mar. 2006, 20 pages.

Ford, et al., "Secure Searching with Oracle Secure Enterprise Search," An Oracle White Paper, Mar. 2006, 14 pages.

Google, "Enterprise Solutions: Google Search Appliance" [webpage], downloaded from the Internet: <<http://www.google.com/enterprise/gsa/>>, 2 pages, 2007.

Risvik, et al., "Search Engines and Web Dynamics," Computer Networks, 39(3):289-302, 2002.

"Oracle® Spatial," Resource Description Framework (RDF), 10g Release 2 (10.2), B19307-01, Jul. 2005, 62 pages.

Author Unknown, "Business Components for Java (BC4J)-Feature Overview," Oracle Technology Network, no date, [retrieved on Apr. 17, 2008], 5 pages. Retrieved from: http://www.oracle.com/technology/products/jdev/htdocs/bc4j9irc_datasheet.html.

Author Unknown, "Google Enterprise Solutions: Google Search Appliance", Google, 2007, [retrieved on Apr. 26, 2007], 2 pages. Retrieved from: http://www.google.com/enterprise/gsa/.

Author Unknown, "Oracle Business Components for Java—An Oracle Technical White Paper," Oracle Corporation, 1999, 38 pages.

Author Unknown, "RDF Support in Oracle," Oracle USA Inc., Jan. 2008, 13 pages.

Author Unknown, "Secure Enterprise Search, Version 10.1.8.2,— Data Sheet," Oracle, 2007, 10 pages.

Jockers, M., POS Tagging XML with xGrid and the Stanford Log-linear Part-of-Speech Tagger, May 2008, 8 pages. Retrieved from: http://www.stanford.edu/~mjockers/cgi-bin/digHum/tagging/postaggingxml.html.

Lopez, X., et al., "Developing Semantic Web Applications using the Oracle Database 10g RDF Data Model," presented at Oracle Open World 2006, Oct. 23-26, 2006, 40 pages.

U.S. Appl. No. 12/201,308, filed Aug. 29, 2008, Advisory Action dated Nov. 9, 2011, 3 pages.

U.S. Appl. No. 12/212,178, filed Sep. 17, 2008, Advisory Action dated Nov. 2, 2011, 3 pages.

U.S. Appl. No. 12/356,314, filed Jan. 20, 2009, Notice of Allowance dated Nov. 22, 2011, 7 pages.

Oracle, "Classification, Clustering and Information Visualization with Oracle Text, An Oracle White Paper," Feb. 2003.

Oracle, "Information Visualization with Oracle 10g Text, An Oracle White Paper," Oct. 2005.

Oracle, "Text Mining with Oracle Text, An Oracle White Paper," Apr. 2005.

Oracle, "Oracle Text, An Oracle Technical White Paper," Jun. 2007.

Oracle Technology Network, "Business Components for Java (BC4J) Feature Overview,", retrieved on Apr. 17, 2008.

Steve Muench, "Building a Web Store with Struts & BC4J Frameworks," Oracle Technology Framework, Sep. 2003.

fast, "Powering Enterprise Search with Fast ESP", 2008.

fast, "Fast ESP™, The World's Most Intelligent, Secure, High-Performance Search Platform," 2008 (#1, 2 pages).

fast, "Fast ESP™, The World's Most Intelligent, Secure, High-Performance Search Platform," 2008 (#2, 7 pages).

fast, "Fast ESP," available at http://www.fastsearch.com/13a.aspx?m=1031 (last visited Sep. 10, 2008).

fast, "Search on Structured Data," available at http://www.fastsearch.com/13a.aspx?m=1104 (last visited Sep. 10, 2008).

Autonomy, "Automatic Classification and Taxonomy Generation," available at http://www.autonomy.com/content/Functionality/idol-functionality-categorization/index.en.html (last visited Sep. 10, 2008).

Autonomy, "Conceptual Search,"available at http://www.autonomy.com/content/Functionality/idol-functionality-conceptual-search/index.en.html (last visited Sep. 10, 2008).

Autonomy, "Natural Language Processing (NLP)," available at http://www.autonomy.com/content/Functionality/idol-functionality-nlp/index.en.html (last visited Sep. 10, 2008).

Autonomy, "IDOL Server," available at http://www.autonomy.com/content/Products/products-idol-server/index.en.html (last visited Sep. 10, 2008).

Oracle, "New Query Features in Secure Enterprise Search 10.1.8.2, An Oracle White Paper," Oct. 2007.

Xavier Lopez, "Developing Semantic Web Applications using the Oracle Database 10g RDF Data Model," presented at Oracle Open World, Oct. 23-26, 2006.

Oracle, "Oracle® Database, Semantic Technologies Developer's Guide, 11g Release 1 (11.1)," B28397-02, Sep. 2007.

Oracle USA Inc., "RDF Support in Oracle", Jan. 2008.

Oracle, "Oracle® Secure Enterprise Search, Administrator's Guide, 10g Release 1 (10.1.8.2)," E10418-01, Sep. 2007.

OracleOwlPrime, "From Owl," Jan. 24, 2008.

Oracle, "Semantic Data Integration for the Enterprise, An Oracle White Paper," Jul. 2007.

Oracle, "New Features in Oracle Text with Oracle Database 11g Release 1, An Oracle White Paper," May 2007.

"POS Tagging XML with xGrid and the Stanford Log-linear Part-of-Speech Tagger," available at http://www.stanford.edu/~mjockers/cgi-bin/digHum/tagging/postaggingxml.html , May 2008.

Searching Enterprise Applications (Siebel 7.8 and e-Business Suite 11i) with Oracle Secure Enterprise Search 10.1.8, An Oracle White Paper, Jan. 2007.

Oracle, "Searching Oracle Content Server (Stellent) with Oracle Secure Enterprise Search 10.1.8, An Oracle White Paper," Sep. 2007.

Oracle, "Secure Enterprise Search, One Search Across Your Enterprise Repositories: Comprehensive, Secure, and Easy to Use," Jan. 2007.

Oracle, "Secure Enterprise Search, Version 10.1.8.2 Data Sheet", 2007.

Oracle, "Secure Searching with Oracle Secure Enterprise Search, An Oracle White Paper," Jan. 2007.

Oracle, "Secure Enterprise Search, Version 10.1.8.2, An Oracle Technical White Paper," Oct. 2007.

Oracle, "Secure Enterprise Search, Version 1 (10.1.8), An Oracle Technical White Paper," Jan. 2007.

The Stanford Natural Language Processing Group, "Stanford Log-Linear Part-of-Speech Tagger," Jun. 6, 2008.

W3C, "Resource Description Framework (RFD): Concepts and Abstract Syntax," Feb. 10, 2004.

W3C, "OWL Web Ontology Language Reference," Feb. 10, 2004.

W3C, "RDF Primer," Feb. 10, 2004.

W3C, "RDF Semantics," Feb. 10, 2004.

W3C, "SPARQL Query Language for RFD," Jan. 15, 2008.

W3C, "RDF/XML Syntax Specification (Revised)," Feb. 10, 2004.

W3C, "RDF Test Cases," Feb. 10, 2004.

W3C, "RDF Vocabulary Description Language 1.0: RDF Schema," Feb. 10, 2004.

Oracle Technology Network, "Oracle Business Components for Java, An Oracle Technical White Paper", 1999.

Oracle, "Oracle 9i, XML Developer's Kits Guide—XDX, Release 2 (9.2)," Mar. 2002.

* cited by examiner

FIG. 7

Enterprise Search | Core Procurement UT | v |

Apps Search Results page

[ 7128 ] [ Go ]

Result Style [ Classic | v ]

701 →

Expand By

Keyword 7128
Group
Object
Filter

Current as of 10-Mar-2008 22:00:00 Estimated Hits 1 Time Taken 0.384 Secs

1002 - BLANKET - USD - 20078 - Medical Staffing Network - VHS STAFF -

Related Objects    Payables Invoices    710

1

Narrow By

- Vendor Site
  - Purchase Order Number
  - Purchase Order Type e.g.
  - Standard/Blanket
  - Purchase Order Status e.g.
  - Open/Close
  - Purchase Order Amount
  - Purchase Order Currency
  - code
  - Vendor Number
  - Vendor Name

| Enterprise Search | v | Core Procurement UT | v | 40746 | Go |

Apps Search Results page

Expand By
Keyword 40746
Group
Object
Filter

Result Style | Classic | v |

☐ Current as of 11-Mar-2008 22:00:00 Page 1 Results 1-2 Estimated Hits 2
Time Taken 0.394 Secs

ERS-10084-40746 - STANDARD - Receipt invoice automatically created on 09-FEB-2004 - Consolidated Supplies ERS-6539-17410 - STANDARD - Receipt invoice automatically created on 27-JAN-03 - 27-Jan-2003 - Container & Packaging Mfg.

1

Narrow By
☐ Invoice number
    Type of invoice
    Description
    Invoice date
    Voucher number
    (Sequential Numbering)
    for invoice
    Supplier name

SEARCHABLE OBJECT NETWORK

CROSS-REFERENCES TO RELATED APPLICATIONS

This application is related to co-pending applications entitled "System and Method for Searching Enterprise Application Data," Ser. No. 12/201,308, filed Aug. 29, 2008, and "System and Method for Semantic Search in an Enterprise Application," Ser. No. 12/212,178, filed Sep. 17, 2008, the disclosure of each of which is incorporated by reference in its entirety for all purposes.

COPYRIGHT NOTICE

A portion of the disclosure of this patent document contains materials which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to enterprise systems, and more particularly to techniques for manipulating searchable data associated with applications in an enterprise system.

Many businesses and other organizations use software applications and/or suites of such applications to organize their business affairs, track business performance, manage employee data and perform similar functions. These enterprise applications are often quite complex, relying on numerous database tables to store and manage data for virtually every aspect of an organization's business. Exemplary enterprise applications can include supply chain management ("SCM") applications that manage raw materials, work-in-process and/or finished products, and coordinate with suppliers; customer relations management ("CRM") applications that are used to track, store and/or manage customer information; financial applications that track and/or analyze the financial performance of the organization; human resources applications that provide management of the human resources functions of the organization; and other applications. In some cases, these applications are standalone applications; in other cases, a single business application or suite of applications might provide some or all such functionality. Specific, non-limiting examples of enterprise applications include JD Edwards Enterpriseone, PeopleSoft Enterprise applications (including, for example, PeopleSoft Enterprise Student Administration), and the Oracle eBusiness Suite, all available from Oracle Corporation.

Enterprise applications typically store and process business data in one or more data stores. In one configuration, the data is stored in one or more tables of a database managed by a relational database management system ("RDBMS") and maintained by the business application. Each enterprise application may use a separate data store, which may be an independent database or portion of a database. Thus, for example, where a business system includes a CRM application and an enterprise resource planning ("ERP") application, the CRM application may use a data store separate from the ERP application. Each application typically maintains and manages the data stored in its data store.

A relational database typically is designed to reduce or minimize redundancy in stored data by structuring the database tables to store data in a normalized form. This can result in a single business object being stored across multiple database tables. The stored data also may include information describing semantic relationships among objects represented by the stored data. Structured queries may be used to extract data from the relevant tables for processing and/or presentation to an end user of the business system. However, data stored in relational databases typically may not be stored or directly accessible in a format conducive to text searching, presentation to end users, or other context-related manipulation. Further, merely converting the stored data into a format that is more conducive to searching may ignore or lose information describing semantic relationships within the data.

In some search regimes, search engines may present similar items as part of the search results. For example, a search engine that indexes and searches web pages on the Internet may return search results based on keyword matching of words or terms provided by a user. The search engine may indicate that there are additional pages that are related to the search results, such as pages that have terms similar to, but not matching the keywords provided by the user, or web pages that appear to be directed to the same topic as selected search results. However, these similar pages are not based on semantic or any other relationships between the search results and the similar web pages.

BRIEF SUMMARY OF THE INVENTION

Embodiments of the present invention provide techniques for creating and searching enterprise data while preserving semantic information stored in enterprise applications. Searchable data definitions that describe searchable data associated with one or more enterprise applications may be configured to store semantic information about the searchable data. The semantic information may then be used to provide additional information and navigation options to a user, such as in response to a search performed by the user.

In an embodiment, a computer-implemented method of preparing data associated with an enterprise application to be searched may include selecting a first object from a plurality of objects associated with the application; selecting a second object from the plurality of objects; identifying a semantic relationship between the first and second objects based on at least one attribute of the first and second objects; and storing an indication of the semantic relationship in a searchable data definition, the searchable data definition identifying searchable data associated with the application and with the first and second objects, and the location of the searchable data, the searchable data usable to execute a search of the searchable data associated with the application. The method may further include selecting a third object from the plurality of objects; identifying attributes of the second and third objects that indicate a semantic relationship between the second and third objects, attributes of the first and third objects that indicate a semantic relationship between the first and third objects, or both; and storing an indication of a semantic relationship indicated by the identified attributes in the searchable data definition. At least one document that stores an indication of the semantic relationship may be created based on the searchable data definition and indexed by a search engine. Attributes of the object that indicate a semantic relationship between the selected object and previously-selected objects may be identified, an indication of each semantic relationship stored in the searchable data definition.

In an embodiment, a computer-implemented method of providing search results may include receiving a search query; generating a first search result for the search query by performing a search using indexed data associated with at least one enterprise application, where the indexed data includes attributes information related to one or more objects associated with the application; identifying, based upon the first search result and the attributes information, a first object from the one or more objects that is semantically related to the search results, where the semantic relationship is identified in a searchable data definition associated with the application; and outputting the first search result and information indicative of the semantically-related first object. The indexed data may be generated from searchable data definition identifying searchable data associated with the application and the location of the searchable data. The searchable object definition may include data that indicates a relationship between the first search result and the first object. The information indicative of the semantically-related first object may be a user-selectable item and, responsive to selection of the item, a second search may be performed using the indexed data and the first object. A second search result generated from the second search, an indication of a second object, and an indication of a semantic relationship between the search result and the object to the user may be presented to the user in any combination. The second search may be performed substantially exclusive of user intervention Hierarchical and/or networked views of objects semantically related to the search result may be presented.

In an embodiment, a system according to the invention may include a plurality of enterprise applications, each enterprise application associated with a relational data store storing searchable data and non-searchable data; and a search modeler in communication with each of the enterprise applications, the search modeler configured to create, for at least one of the enterprise applications, a searchable data definition that identifies searchable data in the relational data store associated with the at least one application, where the search modeler is configured to describe semantic relationships between objects associated with the application. The system may include a search engine to provide search results based on a search query, where the search results indicate objects related to each search result.

In some embodiments, the methods and systems according to the invention may be completely or partially embodied in a computer-readable storage medium storing a plurality of instructions which, when executed by a processor, cause the processor to perform the method.

BRIEF DESCRIPTION OF THE DRAWINGS

FIG. 7 shows the user interface of FIG. 6 after manipulation by a user according to an embodiment of the invention.

FIG. 8 shows the user interface of FIG. 7 after selection of an interface element by a user according to an embodiment of the invention.

DETAILED DESCRIPTION OF THE INVENTION

Techniques for preparing data for searching and performing searches are provided. Searchable data definitions describe the location and format of searchable data within enterprise applications. The searchable data definitions may include attributes of objects associated with an enterprise application and relationships between those objects. Indexable documents may be created from the searchable data definitions, while preserving semantic information available within the enterprise application. Search results can include an indication of objects that are semantically related to each search result, providing more information and increased navigation and search options.

Figure 1:
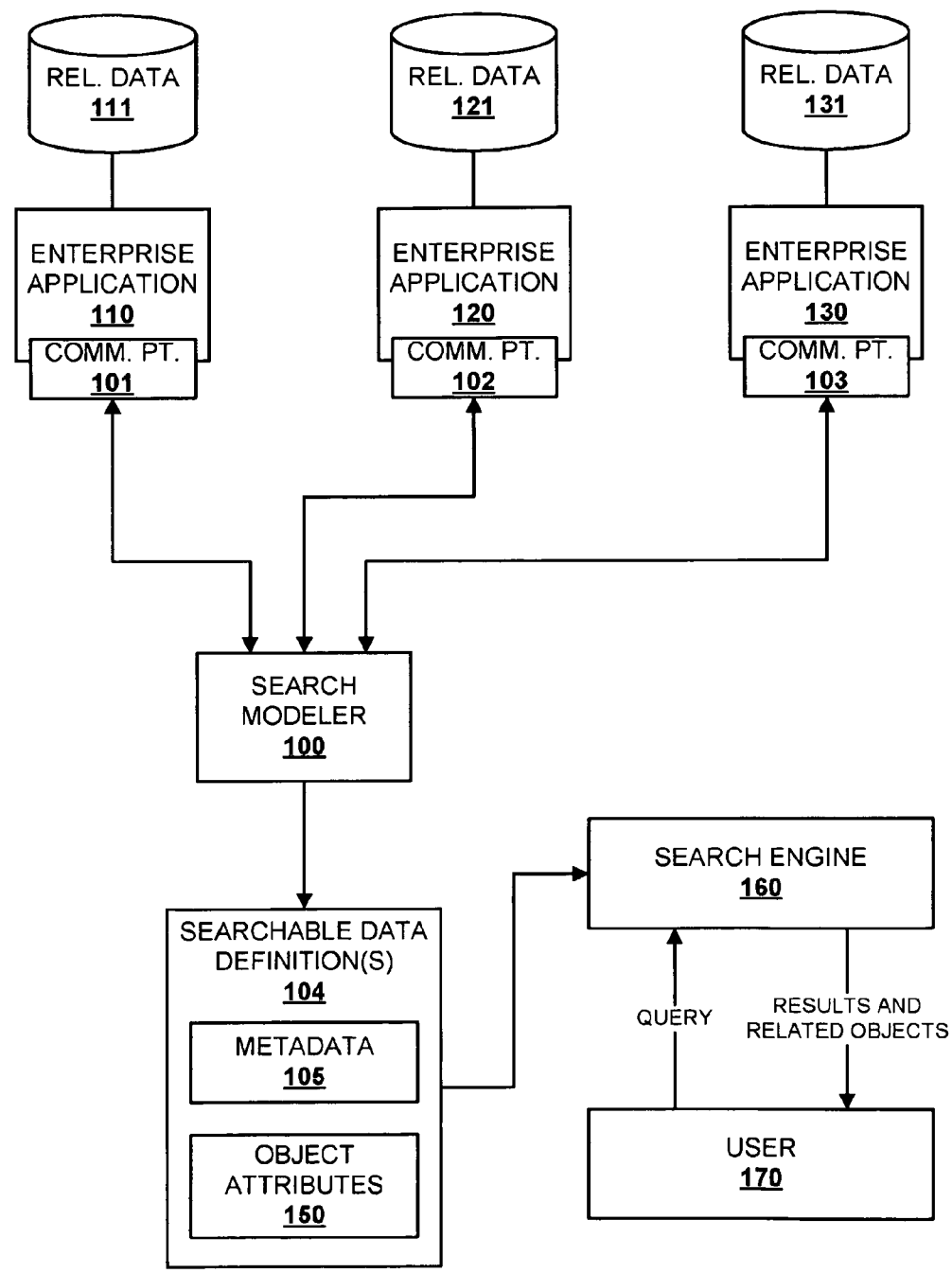
FIG. 1 shows a simplified block diagram of a system having a search modeler that generates searchable data definitions according to an embodiment of the invention.

FIG. 1 shows a simplified block diagram of a system having a search modeler 100 that generates searchable data definitions 104 according to an embodiment. The search modeler 100 communicates with enterprise applications 110, 120, 130 via communications points 101, 102, 103, respectively. Each enterprise application may include a data store 111, 121, 131, respectively, that stores data used by, generated by, or otherwise associated with the application.

The data stores may be implemented as one or more tables of a database managed by a relational database management system ("RDBMS") and maintained by the enterprise application. Each application typically maintains and manages the data stored in its data store. A relational database typically is designed to reduce or minimize redundancy in stored data by structuring the database tables to store data in a normalized form.

The search modeler 100 may provide information describing the location of searchable data within the enterprise applications. For example, the search modeler may indicate database tables or other structures in the data stores 111, 121, 131 that store searchable data, and provide a description of each structure and its relation to other structures in the data stores 111, 121, 131. The search modeler 100 may create searchable data definitions 104 that provide information about the searchable data in each application accessible to the search modeler 100. The searchable data definitions 104 for an application typically include metadata 105 that describes searchable data contained in the relevant enterprise application's data store. For example, a searchable data definition may be a collection of metadata statements or properties that describe searchable data stored in a specific enterprise application 110, 120, or 130. In some embodiments, multiple searchable data definitions may be created for each application. In some embodiments, a searchable data definition may span multiple enterprise applications. The one or more or more searchable data definitions for an application may be referred to herein as a searchable data model for the application.

In an embodiment, a search modeler may allow a user to create a searchable data definition without storing or duplicating data stored in the application or applications for which the searchable data definition is created. For example, the search modeler 100 may connect to one or more enterprise applications 1 10, 120, 130 and receive information about searchable data stored in the applications. The search modeler may present this information to a user and allow the user to request creation of a searchable data definition. As described herein, the search modeler may automate some or all of the creation of the searchable data definition. Since the search modeler uses information about searchable data provided by the enterprise applications, it does not need to retrieve or store the searchable data itself when creating the searchable data definition. Thus, the search modeler allows for efficient creation of searchable data definitions using relatively little communication bandwidth between the search modeler and the applications, with relatively low storage requirements.

In an embodiment, the search modeler may provide information regarding live data. As used herein, "live" data refers to data associated with in-use enterprise applications. In conventional systems, it is undesirable for users to interact with or access live data due to concerns over data corruption or adverse performance effects on the live system. However, since the search modeler can communicate with an enterprise application using its communication point and does not require direct access to the enterprise application data, searchable data definitions may be created based on live data while avoiding the undesirable effects usually associated with operating on live or production systems. For example, it may be undesirable to submit an SQL query to a live database to receive information about the live data, since the query could adversely affect operation of an application using the database. However, in an embodiment of the present invention, the search modeler's access via a communication point is integrated with the enterprise application's database access and management operations. In this manner, undesirable side effects of operating on live data using the search modeler may be reduced or avoided.

The structure and operation of the search modeler and associated systems are further described in co-pending U.S. application Ser. No. 12/201,308, entitled "System and Method for Searching Enterprise Application Data," filed Aug. 29, 2008, the disclosure of which is incorporated by reference in its entirety.

In an embodiment, searchable data definitions 104 may identify object attributes 150 of objects associated with the applications 110, 120, 130. As used herein, an "object" associated with an enterprise application is a logical entity manipulated by the application, such as a customer, purchase order, invoice, or other item. An object may be associated with data stored in one or more database tables or other physical storage entities. Unless specifically indicated otherwise herein, the term "object" refers to such a logical object. In some contexts, an object also may be referred to as a searchable business object or a searchable object.

A search engine 160 may use the searchable data definitions 104 to index and search data stored in the data stores 111, 121, 131. For example, the search engine may parse one or more searchable data definitions to determine the location and structure of searchable data associated with enterprise applications in the system. The search engine then may index the searchable data described by the searchable data definitions. The data may be indexed by a user-accessible search engine 160. It also may be indexed, categorized, searched, or any combination thereof by one or more search engines, data crawlers, or other programs. For example, a search engine 160 may control secondary crawlers that crawl the data described by the searchable data definition.

When a user 170 wishing to search data in the enterprise system may submit a query to the search engine 160. The query may include for example one or more keywords, a plain language query, Boolean terms, or any other query structure.

The search engine 160 processes the query and performs an appropriate search of data described by the searchable data definitions and provides results of the query to the user. In addition to query search results, data identifying and related to one or more logical objects that are determined to be related to the search results may be returned to a user. The data may be returned, for example, based on metadata contained in a searchable object definition.

In an embodiment, the related objects returned by the search engine 160 include one or more objects that are semantically related to one or more search results. As used herein, two items such as an object and a search result are "semantically related" if there exists a business or other real-world relationship between the items or data associated with the items. As a specific example, if the search results from executing a search query include data related to a list of clients or business partners, the semantically related information that is presented to the user along with the search results may include purchase orders, outstanding invoices, and other objects associated with the clients or business partners returned by the search. In the example, the fact that a purchase order is identified as being semantically related to a business partner indicates that the purchase order is somehow related to the business partner within an application associated with the data being searched. For example, the particular purchase order may have been submitted by or received from the business partner. In this manner, the search results received from performing a query search are used to identify data related to objects that are semantically related to the search query results.

Figure 2:
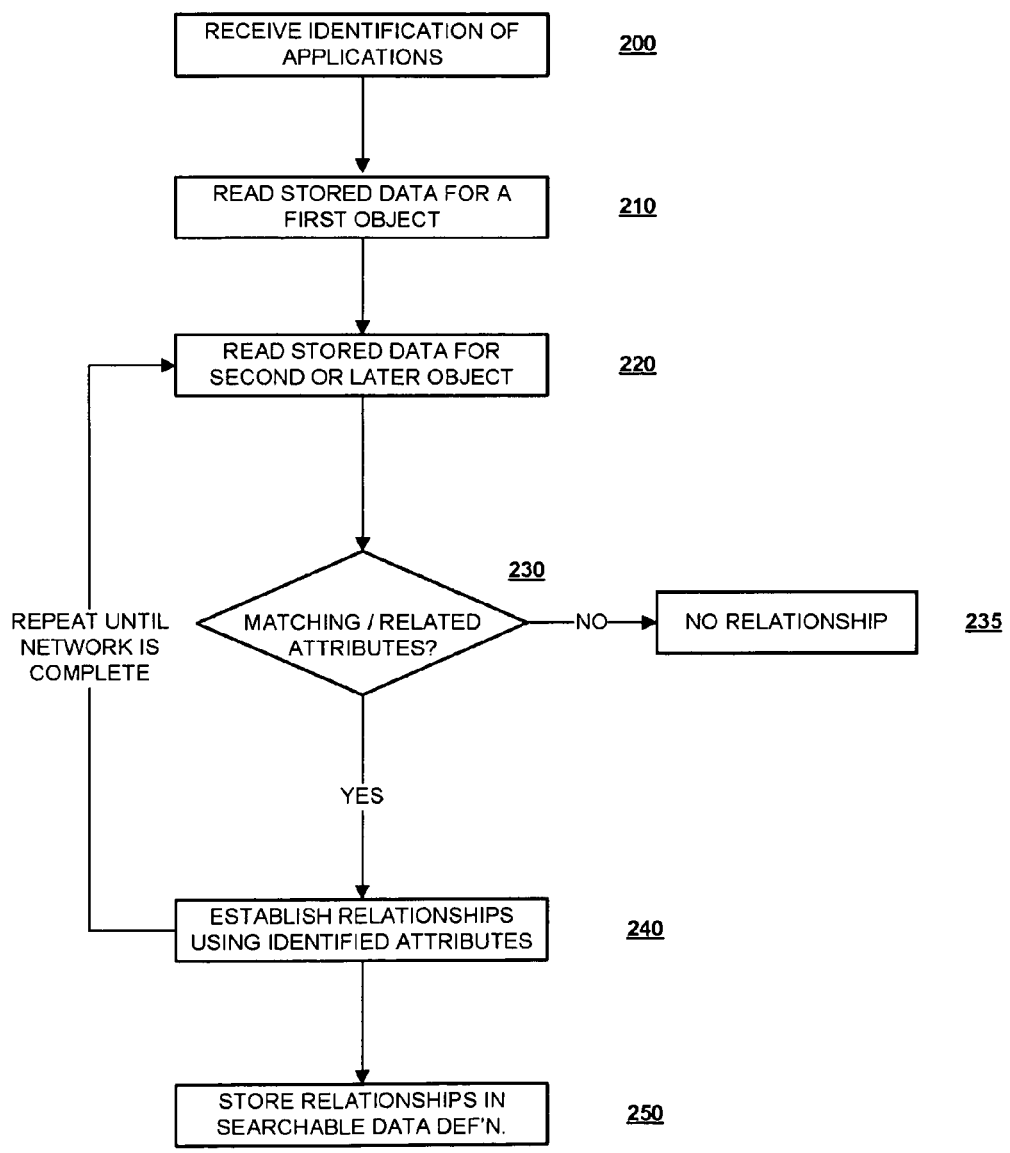
FIG. 2 shows a simplified example process for generating searchable data definitions that include object attributes according to an embodiment of the invention.

In an embodiment, a searchable data definition may include metadata describing attributes and relationships shared between multiple objects. The shared attributes may be related to attributes of physical objects or attributes stored in physical objects, such as where database row identifiers link data in multiple database tables and thereby indicate a relationship between logical objects. This metadata may be used to identify objects that are semantically related to search results presented to a user. For example, when search results are presented to a user, such as in an enterprise application interface, metadata in the searchable object definition may indicate the possibility or existence of semantically-related results. FIG. 2 shows a simplified method for generating searchable data definitions that include object attributes according to an embodiment of the present invention. The method may be performed by software, hardware, or combinations thereof. For example, the method may be performed by a software program such as a data modeler, which may receive input identifying applications, objects, attributes, or any combination thereof from a user.

At 210, stored data associated with a first object is read. A search modeler may automatically select the object for which data is read. The object also may be selected by a user, such as where a user wants the specific object or type of object included in the searchable data definitions.

At 220, data associated with another object is selected. The object may be selected automatically, such as where a search modeler is configured to step through all objects associated with one or more applications, all objects meeting a certain criteria, or in other configurations.

At 230, the search modeler analyzes the data related to the objects to identify attributes that are shared by objects selected in 210 and 220 based on the data associated with the objects. The shared attributes may indicate a semantic relationship between the objects. For example, the two objects may both be related to a third object, such as where two purchase order objects are selected that were both submitted by the same business partner. The objects may have other semantic relationships, such as where one object is the parent of the other, or where one object is generated by the other. As a specific example, if a purchase order is selected in 210 and an outstanding invoice is selected in 220, the purchase order and the outstanding invoice may both be associated with the same customer account or database identifier. As another specific example, a purchase order may be related to the business partner that submitted the purchase order. As illustrated by these examples, when two objects are related each object may have an attribute that is the same as the related object. As a specific example, an order-to-cash business process may include searchable objects such as Customers, Sales Orders, Order Shipments, Sales Invoices, and Payments. Customers and Sales Orders may be related through a common Customer Identifier or Customer Number attribute. Sales Orders and Order Shipments may be related through a common Order Number attribute. Sales Orders and Sales Invoices may be related through a common Order Number attribute. Customer Payments and Sales Invoices may be related through a common Order Number attribute. The same type of attribute may link more than one pair or set of objects. This example and a similar example for a Procure-to-Pay business process are shown in the table below.

| Business Process | Attribute | Objects Linked by Attribute |
| --- | --- | --- |
| Order-to-Cash | Customer Identifier | Customers |
| | | Sales Orders |
| | Customer Number | Customers |
| | | Sales Orders |
| | Order Number | Sales Orders |
| | | Order Shipments |
| | Order Number | Sales Orders |
| | | Sales Invoices |
| | Order Number | Customer Payments |
| | | Sales Invoices |
| Procure-to-Pay | Employee ID | Employees |
| | | Requisitions |
| | Requisition Header ID | Requisitions |
| | | Purchase Orders |
| | Vendor ID | Purchase Orders |
| | | Suppliers |
| | PO Header ID | Purchase Orders |
| | | Shipments |
| | PO Header ID | Purchase Orders |
| | | Invoices |
| | Invoice ID | Invoices |
| | | Payments |
| | Bank Branch ID | Payments |
| | | Banks |

Other business process, attributes, objects, and object-attribute relationships may be used. The specific examples provided above are illustrative only, and are not intended to be limiting in any way.

At 240, the search modeler may establish relationships between the two objects using the attributes identified in 240. For example, if the first object is a customer account and the second is a purchase order placed by the customer, the second object may be identified as being owned by or otherwise related to the first object. Other relationships may be used, such as where two objects have a common parent object, owner, or other semantic connection. One or more relationships may be determined between the two objects.

Steps 220-240 may be repeated for some or all the objects in one or more applications. The steps may be repeated until a complete "object network" is formed for a set of objects. As used herein, an object network describes a set of relationships between and among a given set of objects. For example, in a single enterprise application having a set of associated objects, the object network may describe relationships between the objects in the associated set of objects. Similarly, a smaller object network may describe objects associated with a specific entity, such as a customer, business partner, or other resource that typically is represented as a logical object in the enterprise application.

Object networks may be linked across applications, or may be confined to objects associated with only a single application. For example, an object network associated with a first application may contain a reference to an object network associated with a second application. In such a configuration, an application or process that accesses the first object network may be directed to access the second object network in addition to the first.

In one embodiment, the one or more applications for which an object network is to be built may be identified to the search modeler at 200. The search modeler may then identify the objects associated with the identified applications and then programmatically step through each identified object, comparing the attributes of that object with the other identified objects and in this manner establish relationships between the identified objects to form an object network for the identified applications.

Once relationships between the objects have been identified, the relationships may be stored in one or more searchable data definitions at 250. In an embodiment, a relationship may be stored as a node in a structured record of the definition such as where a searchable object definition is stored in an XML format. In such an embodiment, relationships may be stored as one or more XML nodes.

As previously described, a crawler or other search engine program may use the searchable data definitions to index searchable data in one or more applications. The searchable data may be indexed directly, or the searchable data may be further processed prior to indexing. In some embodiments, an indexing program may create and index documents based on metadata stored in the searchable object definitions. As used herein, a "document" refers to the smallest logical unit of data indexed by a search engine or retrieved during a search.

In an embodiment, a document may be an instance of a searchable object definition that is generated during a crawling process. For example, during a crawling process, a crawler may crawl a searchable object such as a Customer. As a result, multiple documents may be created, with each one corresponding to an actual single Customer or other entity as specified by the searchable object definition. Documents generated by a crawler may be provided to a search engine crawler for indexing.

In an embodiment, an indexable document may be free of semantic relationship information. Thus, a search engine may not be "aware" of relationships that may exist between two objects. When a search associated with an enterprise application is conducted, results may be retrieved and sent to the application. Each search result may be identified as being related to or itself being a specific object. In an example presented below, each search result is identified as belonging to the Vendors object. After search results are returned, metadata in an associated searchable object definition may be read to determine whether there is a relationship between a search result and one or more other objects. If a relationship exists, a link or other indication may be included with the search result and, as described herein, may be selected by the user to retrieve related objects or perform an additional search to locate and retrieve related objects.

Search results may display at least a portion of documents matching a user's search criteria or search query. Documents may be stored in XML format to allow for the inclusion of metadata, such as the metadata provided by searchable object definitions. At 260, one or more documents may be created based on metadata stored in the searchable object definitions.

As a specific example, the following may be included in or as a document containing searchable data related to a vendor having the vendor_id 1742:

```
<item>
  <link>
    <![CDATA[http:// apps.example.com/ BIZOBJECT:Vendors?VENDOR_ID=1742]]>
  </link>
  <title>
    <![CDATA[20004]]>
  </title>
  <itemDesc xmlns="http://xmlns.example.com/orarss">
    <documentMetadata>
      <accessURL>
        <![CDATA[/OA_HTML/RF.jsp?function_id=1042067&resp_id=-1&resp_appl_id=-1&security_group_id=0&lang_code=US&params=0UBnNCinEOK2i6SMsJqJoor3XoSfJpSo
Z5dnbWCGSBuZSAUZDIfsv08gqT8prJuG]]>
      </accessURL>
      <language>en</language>
      <docAttr name="VENDOR_ID"><![CDATA[1742]]></docAttr>
      <docAttr name="SEGMENT1"><![CDATA[20004]]></docAttr>
      <docAttr name="VENDOR_LOOKUP_CODE"><![CDATA[SUPPLIER]]></docAttr>
      <docAttr name="PARTY_ID"><![CDATA[299424]]></docAttr>
      <docAttr name="PARTY_NAME"><![CDATA[Amcan Industries]]></docAttr>
    </documentMetadata>
    <documentAcl>
      <securityAttr name="EBS_ACL_KEY">xyz100001x</securityAttr>
    </documentAcl>
    <documentInfo>
      <status>STATUS_OK_FOR_INDEX</status>
    </documentInfo>
    <documentContent>
      <content type="text/plain">
        <![CDATA[ 20004 SUPPLIER Amcan Industries]]>
      </content>
    </documentContent>
  <itemDesc>
</item>
```

An example of object relationship metadata pertaining to a Vendor object definition is shown below. The example illustrates that a document of a Vendor object may be related to a corresponding Purchase Order document:

```
<?xml version="1.0" encoding="UTF-8"?>
<orcl:relateBusinessObjects xmlns='http://www.oracle.com/apps/fnd/search'
 xmlns:orcl='http://www.oracle.com/apps/fnd/search'
 xmlns:xsi='http://www.w3.org/2001/XMLSchema-instance'
 xsi:schemaLocation='http://www.oracle.com/apps/fnd/search RelateBusinessObjects.xsd'>
  <orcl:objectName>BIZOBJECT:Vendors</orcl:objectName>
  <orcl:relationList>
    <orcl:relation>
      <orcl:referencingObject type="Local">
        <orcl:objectName>BIZOBJECT:Vendors</orcl:objectName>
        <orcl:attributeName>VENDOR_ID</orcl:attributeName>
      </orcl:referencingObject>
      <orcl:referencedObject type="Local">
        <orcl:objectName>BIZOBJECT:Payables_Invoices</orcl:objectName>
        <orcl:attributeName>VENDOR_ID</orcl:attributeName>
      </orcl:referencedObject>
    </orcl:relation>
    <orcl:relation>
      <orcl:referencingObject type="Local">
        <orcl:objectName>BIZOBJECT:Vendors</orcl:objectName>
        <orcl:attributeName>VENDOR_ID</orcl:attributeName>
```

```
        </orcl:referencingObject>
        <orcl:referencedObject type="Local">
            <orcl:objectName>BIZOBJECT:Purchase_Orders</orcl:objectName>
            <orcl:attributeName>VENDOR_ID</orcl:attributeName>
        </orcl:referencedObject>
    </orcl:relation>
 </orcl:relationList>
</orcl:relateBusinessObjects>
```

An example of a Purchase Order document belonging to the Vendor document described above may be:

```
<item>
<link><![CDATA[http://oracle.apps.search.com/appsearch/BIZOBJECT:Purchase_Orders?PO_HEADER_ID=
3533&VENDOR_ID=9]]></link>
    <title><![CDATA[769]]></title>
    <itemDesc xmlns="http://xmlns.oracle.com/orarss">
<documentMetadata><accessURL><![CDATA[/OA_HTML/RF.jsp?function_id=1038349&
resp_id=-1&resp_appl_id=-
1&security_group_id=0&lang_code=US&params=9svgerbsQoiA504p7tMskHZT7KJKeltM
ZBIAhevdAQJkiGrXhEYsNP4WFpgF2BYEKnU3MAJMFhDkAwFQbnDD-
JGvYx9P38W8v53hnfqkzEA]]></accessURL>
    <language>en</language>
    <docAttr name="TYPE_LOOKUP_CODE"><![CDATA[BLANKET]]></docAttr>
    <docAttr name="PO_HEADER_ID"><![CDATA[3533]]></docAttr>
    <docAttr name="AMOUNT_LIMIT"><![CDATA[1000000]]></docAttr>
    <docAttr name="CURRENCY_CODE"><![CDATA[USD]]></docAttr>
    <docAttr name="SEGMENT1"><![CDATA[769]]></docAttr>
    <docAttr name="ORG_ID"><![CDATA[204]]></docAttr>
    <docAttr name="VENDOR_NAME"><![CDATA[Amcan Industries]]></docAttr>
    <docAttr name="SEGMENT1-1"><![CDATA[20004]]></docAttr>
    <docAttr name="VENDOR_ID"><![CDATA[1742]]></docAttr>
    <docAttr
name="VENDOR_SITE_CODE"><![CDATA[OFFICESUPPLIES]]></docAttr>
    </documentMetadata>
    <documentAcl>
        <securityAttr name="EBS_ACL_KEY">xyz100001x</securityAttr>
    </documentAcl>
    <documentInfo><status>STATUS_OK_FOR_INDEX</status></documentInfo>
    <documentContent>
        <content type="text/plain"><![CDATA[ BLANKET 1000000 USD 769 Office
Supplies, Inc. 1008 OFFICESUPPLIES Each Paper Miscellaneous
            Each Leather Computer Case Office Supplies
            Each Mobile phone Office Supplies
            Each Paper Office Supplies
            Each Paper [Miscellaneous سلا]
            Each Leather Computer Case [Office Supplies سلام]
            Each Mobile phone [Office Supplies سلام]
            Each Paper [Office Supplies سلام]
            Each Paper [MiscellaneousΩ'+++Ø
            Each Leather Computer Case [Office SuppliesΩ'+++ 'Ø
            Each Mobile phone [Office SuppliesΩ'+++ 'Ø
            Each Paper [Office SuppliesΩ'+++ 'Ø
            ]]>
        </content>
    </documentContent>
    </itemDesc>
</item>
```

Thus, a document may specify one or more "key=value" pairs. In this example, the attribute "VENDOR_ID" links the document to other documents having the same attribute (i.e., being assigned the same VENDOR_ID of 1742). Thus, queries such as "purchase orders for vendor 1742" may be processed. In that configuration, documents created for those purchase orders may include the same key=value pair. Further attributes may be included to provide additional information or describe relationships with other objects. In the specific example above, the vendor name ("PARTY_NAME") is identified as "Amcan Industries." Such a configuration may allow for queries such as "purchase orders for Amcan Industries." Using additional identifiers or other information in the system and captured in documents, more complex queries such as, for example, "purchase orders for Amcan Industries more than six months old that have outstanding balances" also may be processed. Other attributes and relationships may be used.

Figure 3:
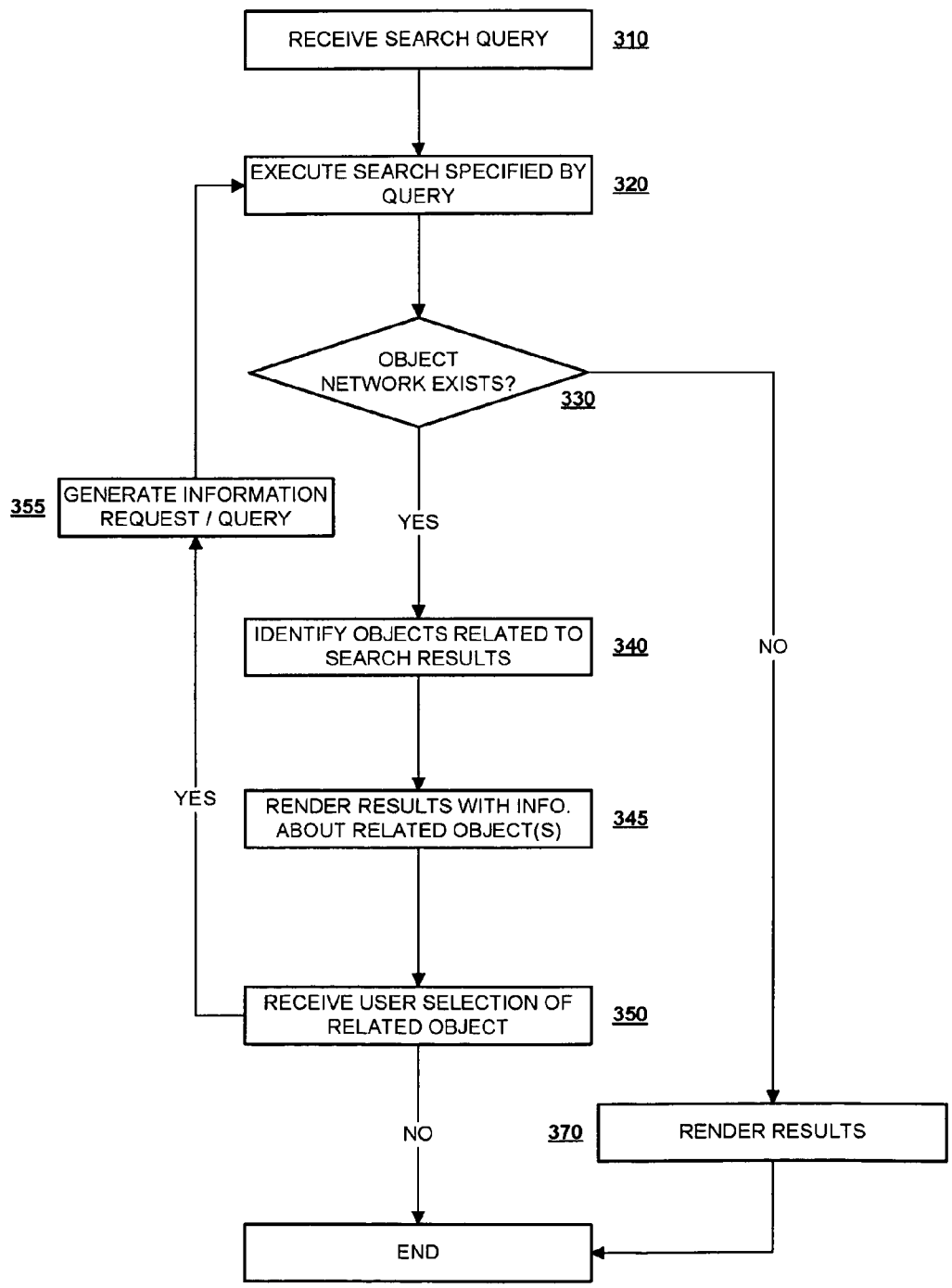
FIG. 3 shows a simplified example of a process for performing a search and presenting search results to a user according to an embodiment of the invention.

A search engine may use object attributes and relationships when constructing search results. FIG. 3 shows a simplified example of a process for performing a search and presenting search results to a user. At 3 10, a search query is received from a user. The query may include one or more keywords, a plain language query, Boolean expressions, or any other query structure. The query also may indicate a specific key=value pair. At 320, the search engine may execute the search specified by the query to generate search results that satisfy the query. At 330, the search engine may examine the indexed documents or other data structures to determine if an object network exists. If no object network is present, i.e., the indexed documents do not identify attributes shared among other objects, then at 380 the search engine may render the search results that satisfy the query. Since no object network is present, the search results may not include information identifying objects that are semantically related to the search results.

If it is determined in 330 that an object network exists, then search results may include additional information. For example, at 340 the search engine may identify one or more objects that are semantically related to one or more of the search results based on metadata stored in a searchable data definition. At 345, the search engine may render results that satisfy the query and include additional information about the semantically-related objects.

As a specific example, the search results may include a list of business partners. In 345, the rendered information may display the names of the business partners. If the searchable object definition indicates that business partners may be related to invoices, one or more links may be rendered for business partner search results to provide an option to retrieve or search related invoices. In an embodiment, if a searchable object definition includes an identification of a relationship, a link to query the related object may be rendered. If no related objects exist, a second search performed upon selection of the link may render no results. In the example, if no invoices exist for a specific business partner, when a user selects a link for related invoices, no search results may be returned, or a message indicating that no related invoices exist may be presented.

Information about the semantically-related objects may be displayed in various ways. In an embodiment, the search results and the information about semantically-related objects may be displayed in the same interface in a manner such that, for a particular search result, a user can identify an object that is semantically related to the result. In an embodiment, a link or other selectable user interface may be displayed that corresponds to the semantically-related object. In an embodiment, objects semantically related to one or more search results may be listed in a portion of a user interface distinct from the search results.

In an embodiment, semantically-related objects may be identified by a user-selectable item, such as a button or link, presented in the user interface displaying the search results. As a specific example, if a search query submitted to an enterprise application specified a name, the search results generated in response to the search query may include one or more documents relating to one or more business partners having a name that matches the name specified in the search query. Based on the query search results, the search engine may then use an object network built for the enterprise application to identify one or more objects that are semantically related to one or more of the matching business partners. These semantically-related objects may include for example, one or more purchase orders, invoices, contacts, and other objects related to the business partners. One or more links or buttons (or other user-selectable items) may be displayed representing the semantically related objects. For example, for a particular search query result, a link may be displayed corresponding to all semantically-related objects determined for that particular search query result.

A user viewing the rendered query results and the links (or other user-selectable items) may then select a particular link. Accordingly, information may be received in 350 indicating selection of a particular link by the user.

In response to the link selection in 350, at 355, an information request may be generated corresponding to the selected link. For example, if the search results include a list of business partner names, a user may select a link corresponding to purchase orders that are determined to be semantically related to a business partner name. The information request in 355 may be in the form of a query that requests all purchase orders related to that business partner. Other combinations and configurations of search results and related objects or object types may be used.

In 320, the system may then execute the information request generated in 355. For example, the system may perform an additional search at 320 to identify specific objects that are associated with the user-selected item. That is, the search may identify the objects that caused the portion of the object network related to the user-selected item to be created. The search may be transparent to the user. As used herein, a "transparent" search is executed without requiring further input from the user. The user may or may not be aware that a transparent search has been performed.

Continuing the specific example described above, when the user selects the link for purchase orders related to a specific business partner, the additional query constructed at 355 may request purchase orders associated with the selected business partner. The additional search performed at 320 may be performed automatically when the user selects the purchase orders link, and the system may not indicate that a search is being performed other than providing the results of the search. For example, a list of related purchase orders may be immediately provided to the user.

After an additional search is performed at 320, the system may examine the new search results to determine if a further object network exists at 330. As shown in FIG. 3, the process of identifying an object network, rendering search results, and performing additional searches may continue until no further related information requests are received or until the search results do not include any further object network links.

Figure 4A:
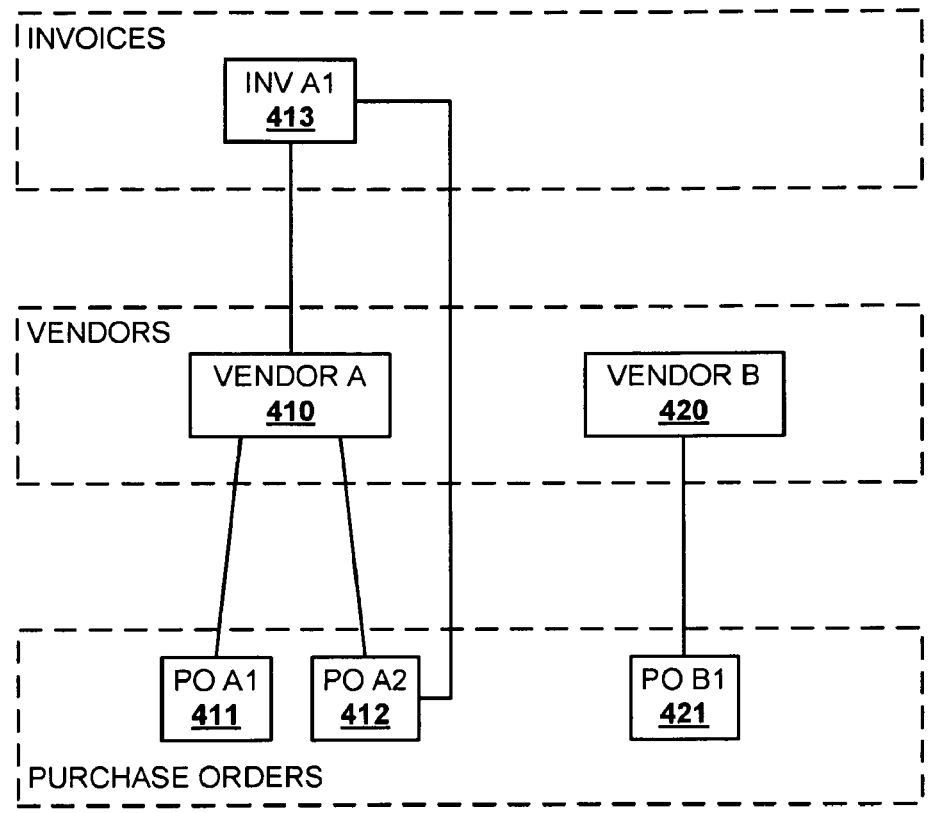
FIG. 4A shows a simplified schematic representation of an example object network according to an embodiment of the invention.

FIG. 4A shows a simplified schematic representation of an example object network according to an embodiment of the present invention. The dotted lines in FIG. 4A represent groups of logical objects. The example object network includes two vendor objects 410, 420 that are semantically related to invoices and purchase orders as shown. Solid lines show semantic relationships between the objects in the object network. For example, Vendor A 410 is semantically related to Invoice A1 413 (e.g., Vendor A may be owed payment on an outstanding invoice A1), Purchase Order A1 411 and Purchase Order A2 412. Vendor B 420 is semantically related to a single Purchase Order 421. The relationships among objects in an object network may be stored in indexed documents as previously described.

Figure 4B:
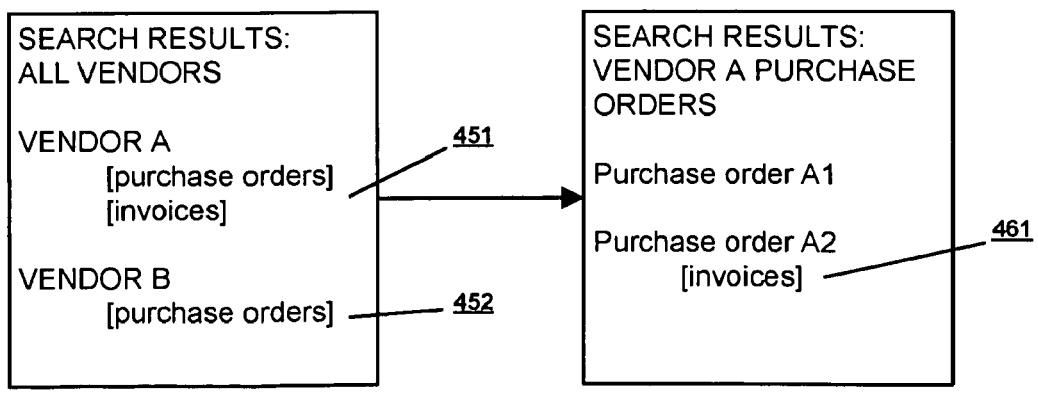
FIG. 4B shows a simplified schematic of a user interface displaying information based on the example object network illustrated in FIG. 4A according to an embodiment of the invention.

FIG. 4B shows a simplified schematic of a user interface displaying information based on the example object network illustrated in FIG. 4A. An initial interface 451 may show the results of a search requested by a user, such as all vendors or all vendors meeting a certain criteria specified in a search query. In the example system, two vendors are found to meet the query criteria, Vendor A and Vendor B. Information identifying the vendors is displayed. Additionally, as shown in FIG. 4A, information related to objects that are semantically related to the query search results (i.e., related to Vendor A and Vendor B) is also displayed. For example, for Vendor A, two links corresponding to "purchase orders" and "invoices" are displayed to indicate the presence of one or more purchase orders and invoices related to vendor A. Likewise, for vendor B a single link, "purchase orders," is displayed to indicate the presence of one or more purchase orders that are semantically related to Vendor B. The displayed information thus includes not only search results that satisfy the query but also information related to objects that are determined to be semantically related to the query search results.

A user may select one of the links. In response to selection of a link, a further search is performed and results from the search may be displayed in the same of different window. For example, as depicted in FIG. 4B, a user has selected the "purchase orders" link associated with Vendor A. The resultant search results 460 are displayed. The additional search results 460 may result from a transparent search conducted by the system based on the user's selection of an interface element 451 in the initial search results. As shown in the object network illustrated in FIG. 4A, there are two purchase orders A1, A2 associated with Vendor A, and purchase order A2 is also related to an invoice. The additional search results 460, therefore, may list the two purchase orders and provide a user interface element 461 indicating that purchase order A2 has at least one invoice associated with it. This user interface element may operate in a manner similar to those provided in the initial results 450, such as by displaying all invoices associated with purchase order A2.

Figure 5:
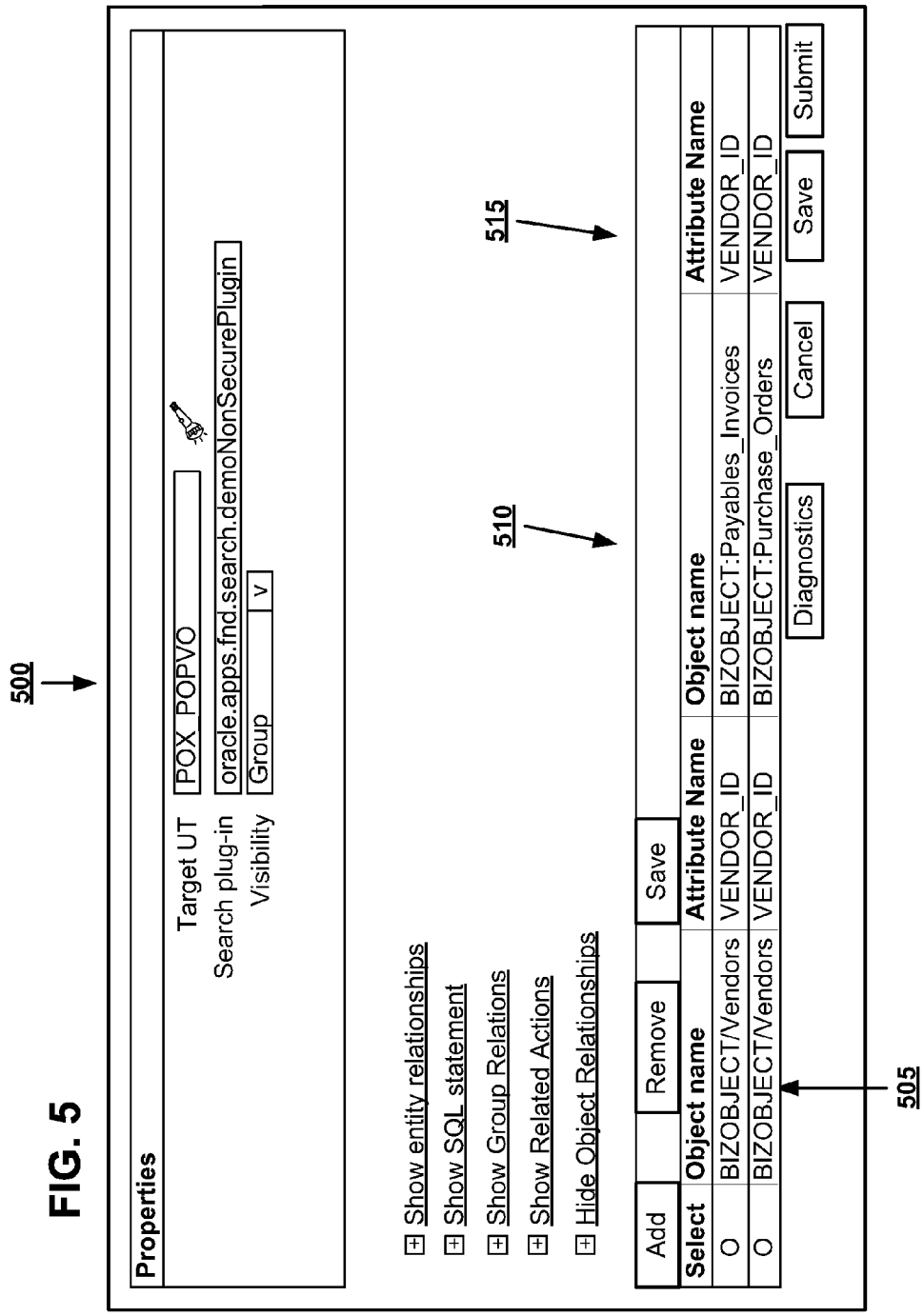
FIG. 5 shows an interface to display information about an object in an enterprise system according to an embodiment of the invention.

FIGS. 5-8 show various user interfaces suitable for use with embodiments of the invention. FIG. 5 shows an interface that displays information about an object in an enterprise system. As a specific example, an interface 500 may show information about a Vendor object 505 in an enterprise application. The Vendor object may be related to two other objects 510, a Payables_Invoices object and a Purchase_Orders object. The interface may indicate a shared attribute that causes the objects to be related. In the example, the two related objects 510 each has an attribute 515 "VENDOR_ID" that is the same as the VENDOR_ID of the Vendor object, thus indicating that the two objects 510 are related to the Vendor object. Other attributes and relationships may be used and displayed in an object interface.

Figure 6:
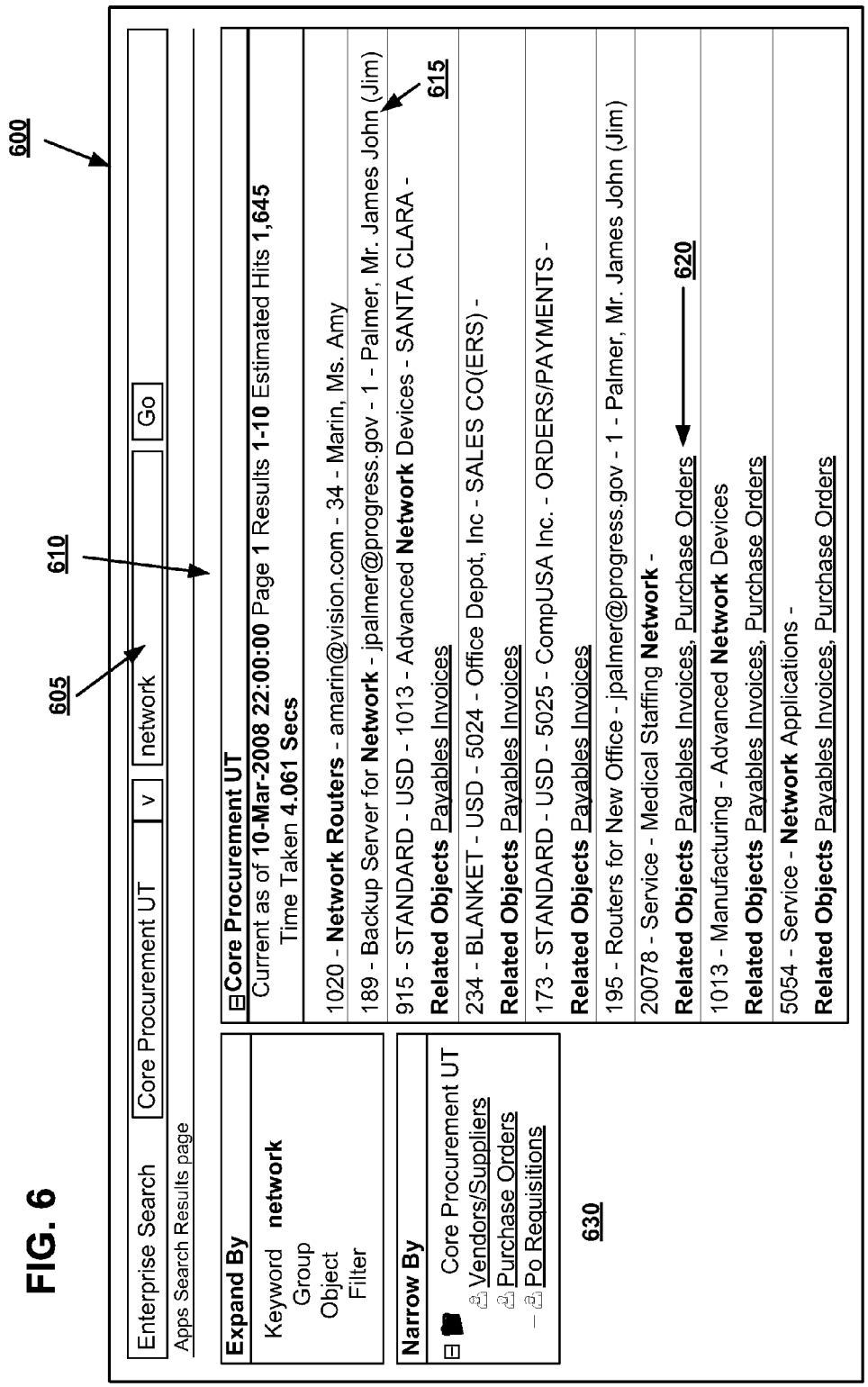
FIG. 6 shows a search interface for use in an enterprise application according to an embodiment of the invention.

FIG. 6 shows a search interface for use in an enterprise application. A user may enter search terms and select an appropriate application or other division of the enterprise system to search using a search term dialog 605. A portion of the interface displays search results 610 that match the terms entered by the user. For example, a list of indexed documents containing to the user's search terms may be displayed. Each search result may include interface elements 620 indicating objects semantically related to the search result, if any. The semantically-related objects may be displayed in a networked view as shown, where each object is positioned near the search result to which it is related. If there are no other objects semantically related to the result, a result 615 may be displayed without the user interface elements. As previously described, the search interface may perform an additional search when one of the interface elements 620 is selected by the user, such as to retrieve objects of a type matching the selected element. The search may be transparent to the user. The interface 600 also may display semantically-related objects in a hierarchical fashion, such as an expandable tree 630. In the example, the search results within the "Core Procurement UT" may be grouped based on whether each result has associated "Vendors/Suppliers," "Purchase Orders," or "PO Requisitions." By selecting the appropriate node in the hierarchical representation 630, the user may restrict display of the search results 610 to those having at least one semantically-related object of the selected type. Other object types and hierarchies may be used.

FIG. 7 shows the user interface of FIG. 6 after a user selects the "Purchase Orders" interface element 630. As shown and as previously described, additional search results based on the selected element may be shown in the interface. The results may include one or more user interface elements 710 to indicate objects semantically related to each additional search result. FIG. 8 shows further additional search results displayed when the user selects the "Payable Invoices" element 710 shown in FIG. 7. As shown in FIGS. 7 and 8, the additional search results may be generated by a search using an automatically-generated search query 701, 801. For example, attributes associated with one or more documents or objects may be used as search terms, to identify additional objects and documents related to the same attribute. As previously described, these attributes may be included in indexed documents to identify related objects in an object network.

In an embodiment, search engine federation may be used to link enterprise applications and related search functionality between applications provided by different vendors or other providers. For example, each enterprise application may be associated with one or more search engine and/or indexing engine instances. A Federation Engine may coordinate or oversee operation of the instances, distribute search queries, collect search results, and propagate results to users. In such a system, related object links also may be propagated between Federated systems to allow a second or subsequent query for related objects to be processed by the appropriate application.

As a specific example, in an Order-to-Cash business process a Customers object may be defined in a CRM enterprise application from a first provider. The CRM application may include a searchable object definition for the Customers object, and may also store and track Customer Orders. The CRM application may also be associated with one or more search and/or indexing engines. Financial information, such as Invoices and Payments objects, may be stored and processed in an E-business enterprise application from a second provider that is different from the first provider. The E-business application may be associated with one or more search and/or indexing engines, which may be separate from the engines associated with the CRM application. When a user of the CRM application issues a query for a specific customer, it may be forwarded to the common Federation Engine. Upon receiving search results, the CRM application also may receive one or more related objects links to, for example, the Customer Payments object. Since the Payments object is indexed by a system separate from the CRM indexing system, search Federation may be used to transfer data between applications. Thus, a second query for Customer Payments may be processed and related search results may be accumulated from a different indexing system.

Figure 9:
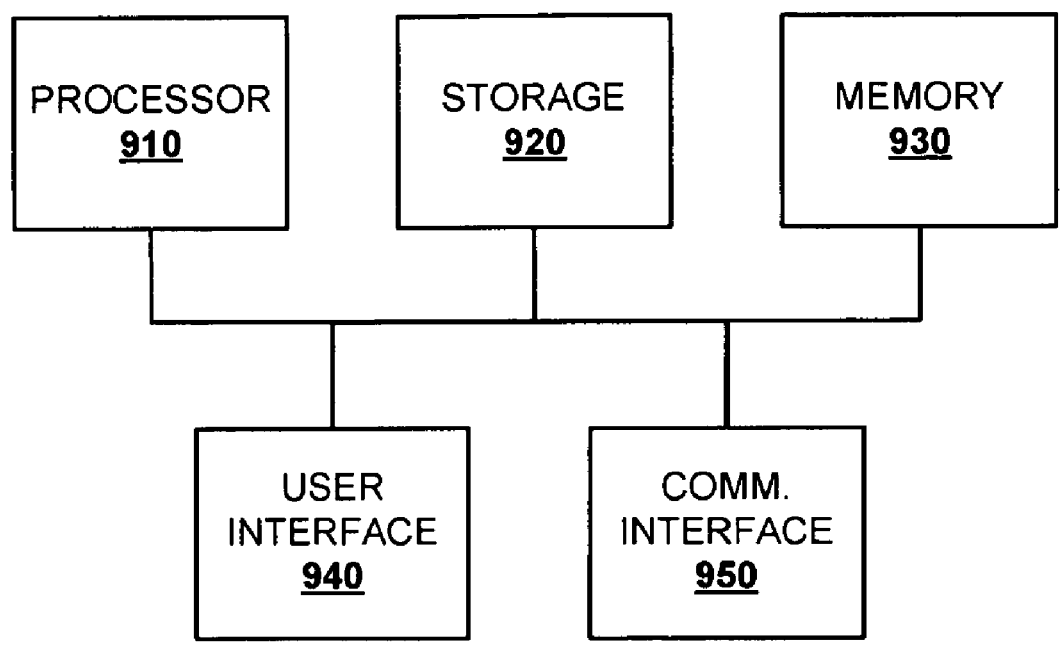
FIG. 9 shows a general-purpose computer suitable for implementing embodiments of the invention.

FIG. 9 shows a general-purpose computer suitable for implementing the systems and methods described herein. The computer may include a processor 910 capable of executing instructions stored on a computer-readable storage medium 920. Data used and created by the computer also may be stored on the storage medium 920. The instructions, data, or combinations thereof also may be stored in other memory 930, such as volatile or other memory. The computer may include a user interface 940 capable of providing data to, and receiving data from, a user of the computer. The computer also may include a communication interface 950, such as a network interface, capable of communicating with another computer, storage device, user, or other entity that may be directly connected to or remote from the computer. Other devices and structures may be included as known in the art.

In the foregoing description, for the purposes of illustration, methods were described in a particular order. It should be appreciated that the methods may be performed in a different order than that described. Additionally, unless indicated otherwise the methods may contain additional steps or omit steps described herein. The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more computer-readable storage media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. The methods also may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method of preparing data associated with an enterprise application to be searched, comprising:
    selecting a first object from a plurality of objects associated with the application;
    selecting a second object from the plurality of objects;
    identifying a semantic relationship between the first and second objects based on at least one attribute of the first and second objects;
    for each of the plurality of objects, selecting an object and identifying attributes of the object that indicate a semantic relationship between the selected object and previously-selected objects, wherein the selecting and the identifying is transparent to the user and in response to the user's selection of at least the second object; and
    storing an indication of each semantic relationship indicated by the identified attributes in the searchable data definition;
    storing an indication of the semantic relationship in a searchable data definition, the searchable data definition identifying searchable data associated with the application and with the first and second objects, and the location of the searchable data, wherein the searchable data is data usable to execute a search of the searchable data associated with the application;
    executing the search of the searchable data associated with the application; and
    providing search results based on the executed search; and
    creating at least one document based on the searchable data definition, the at least one document being indexed by a search engine while preserving the semantic information within the enterprise application, wherein the indexed data is generated from the searchable data definition identifying searchable data associated with the application and the location of the searchable data and format of the searchable data required by the enterprise application.

2. The computer-implemented method of claim 1, further comprising:
    selecting a third object from the plurality of objects;
    identifying at least one of:
        attributes of the second and third objects that indicate a semantic relationship between the second and third objects, and
        attributes of the first and third objects that indicate a semantic relationship between the first and third objects; and
    storing an indication of a semantic relationship indicated by the identified attributes in the searchable data definition.

3. A computer-readable storage medium storing a plurality of instructions which, when executed by the processor, cause the processor to perform a method comprising:
    selecting a first object from a plurality of objects associated with the application;
    selecting a second object from the plurality of objects;
    for each of the plurality of objects, selecting an object and identifying attributes of the object that indicate a semantic relationship between the selected object and previously-selected objects, wherein the selecting and the identifying is transparent to the user and in response to the user's selection of at least the second object;
    storing an indication of each semantic relationship indicated by the identified attributes in the searchable data definition;
    identifying attributes of the first and second objects that indicate a semantic relationship between the first and second objects;
    storing an indication of the semantic relationship in a searchable data definition, the searchable data definition identifying searchable data associated with the application and with the first and second objects, and the location of the searchable data, wherein the searchable data is data usable to execute a search of the searchable data associated with the application;
    executing the search of the searchable data associated with the application;
    providing search results based on the executed search, wherein the search results include a list of clients or business partners and an interface configured to provide access to at least one or more of the following: purchase orders, invoices, or status information associated with each client or partner within the search results; and
    creating at least one document based on the searchable data definition, the at least one document being indexed by a search engine while preserving the semantic information within the enterprise application, wherein the indexed data is generated from the searchable data definition identifying searchable data associated with the application and the location of the searchable data and format of the searchable data required by the enterprise application.

4. A computer-implemented method of providing search results, comprising:
    selecting a first object from a plurality of objects associated with the application;
    selecting a second object from the plurality of objects;
    for each of the plurality of objects, selecting an object and identifying attributes of the object that indicate a semantic relationship between the selected object and previously-selected objects, wherein the selecting and the identifying is transparent to the user and in response to the user's selection of at least the second object;
    storing an indication of each semantic relationship indicated by the identified attributes in the searchable data definition;
    identifying attributes of the first and second objects that indicate a semantic relationship between the first and second objects;
    storing an indication of the semantic relationship in a searchable data definition, the searchable data definition identifying searchable data associated with the application and with the first and second objects, and the location of the searchable data, wherein the searchable data is data usable to execute a search of the searchable data associated with the application;
    executing the search of the searchable data associated with the application;
    providing search results based on the executed search, wherein the search results include a list of clients or business partners and an interface configured to provide access to at least one or more of the following: purchase orders, invoices, or status information associated with each client or partner within the search results;

creating a search query based on the searchable data definition, the search query being indexed by a search engine while preserving the semantic information within the enterprise application, wherein the indexed data is generated from the searchable data definition identifying searchable data associated with the application and the location of the searchable data and format of the searchable data required by the enterprise application;

receiving the search query;

generating a first search result for the search query by performing a search using indexed data associated with at least one enterprise application, the indexed data comprising attributes information related to one or more objects associated with the application;

identifying, based upon the first search result and the attributes information, a first object from the one or more objects that is semantically related to the search results, the semantic relationship identified in a searchable data definition associated with the application; and outputting the first search result and information indicative of the semantically-related first object, wherein the first result includes a list of clients or business partners and an interface configured to provide access to at least one or more of the following: purchase orders, invoices, or status information associated with each client or partner within the first result.

5. The computer-implemented method of claim 4, wherein the first search result includes data read from an indexed document indicating a relationship between the first search result and the first object.

6. The computer-implemented method of claim 4, wherein the information indicative of the semantically-related first object is a user-electable item, the method further comprising:

receiving information indicative of selection of the user-selectable item;

responsive to the selection, performing a second search using the indexed data and the first object;

presenting a second search result generated from the second search, an indication of a second object, and an indication of a semantic relationship between the search result and the object to the user.

7. The computer-implemented method of claim 6, wherein the second search is substantially exclusive of user intervention.

8. The computer-implemented method of claim 4, further comprising displaying a hierarchical view of a plurality of objects semantically related to the search result.

9. The computer-implemented method of claim 4, further comprising:

displaying a networked view of the search result and the object; and displaying a hierarchical view of objects associated with the search result.

10. The computer-implemented method of claim 4, wherein the first search result is associated with an object in a first enterprise application, and the first object is associated with a second enterprise application separate from the first enterprise application.

11. The computer-implemented method of claim 10, wherein the first enterprise application is provided by a different vendor than the second enterprise application.

12. A computer-readable storage medium storing a plurality of instructions which, when executed by a processor, cause the processor to perform a method comprising:

selecting a first object from a plurality of objects associated with the application;

selecting a second object from the plurality of objects;

for each of the plurality of objects, selecting an object and identifying attributes of the object that indicate a semantic relationship between the selected object and previously-selected objects, wherein the selecting and the identifying is transparent to the user and in response to the user's selection of at least the second object;

storing an indication of each semantic relationship indicated by the identified attributes in the searchable data definition;

identifying attributes of the first and second objects that indicate a semantic relationship between the first and second objects;

storing an indication of the semantic relationship in a searchable data definition, the searchable data definition identifying searchable data associated with the application and with the first and second objects and the location of the searchable data, wherein the searchable data is data usable to execute a search of the searchable data associated with the application;

executing the search of the searchable data associated with the application;

providing search results based on the executed search, wherein the search results include a list of clients or business partners and an interface configured to provide access to at least one or more of the following: purchase orders, invoices, or status information associated with each client or partner within the search results;

creating a search query based on the searchable data definition, the search query being indexed by a search engine while preserving the semantic information within the enterprise application, wherein the indexed data is generated from the searchable data definition identifying searchable data associated with the application and the location of the searchable data and format of the searchable data required by the enterprise application;

receiving the search query;

generating a first search result for the search query by performing a search using indexed data associated with at least one enterprise application, the indexed data comprising attributes information related to one or more objects associated with the application;

identifying, based upon the first search result and the attributes information, a first object from the one or more objects that is semantically related to the search results, the semantic relationship identified in a searchable data definition associated with the application; and outputting the first search result and information indicative of the semantically-related first object, wherein the first result includes a list of clients or business partners and an interface configured to provide access to at least one or more of the following: purchase orders, invoices, or status information associated with each client or partner within the first result.

* * * * *

UNITED STATES PATENT AND TRADEMARK OFFICE
CERTIFICATE OF CORRECTION

PATENT NO.       : 8,296,317 B2              Page 1 of 1
APPLICATION NO.  : 12/210420
DATED            : October 23, 2012
INVENTOR(S)      : Ghosh It is certified that error appears in the above-identified patent and that said Letters Patent is hereby corrected as shown below:

On Title page 3, in column 2, under "Other Publications", line 19, delete "Vocabolary" and insert -- Vocabulary --, therefor.

On Title page 3, in column 2, under "Other Publications", line 23, delete "—XDX," and insert -- —XDK, --, therefor.

In the Specifications:

In column 1, line 49, delete "Enterpriseone," and insert -- EnterpriseOne, --, therefor.

In column 4, line 67, delete "1 10," and insert -- 110,--, therefor.

In column 9, line 37, delete "<itemDesc>" and insert -- </itemDesc> --, therefor.

In column 12, line 61, delete "3 10," and insert -- 310, --, therefor.

In the Claims:

In column 19, line 38, in Claim 6, delete "user-electable" and insert -- user-selectable --, therefor.

Signed and Sealed this
Twenty-seventh Day of August, 2013

Teresa Stanek Rea
*Acting Director of the United States Patent and Trademark Office*